United States Patent
Lewis

(10) Patent No.: US 7,194,099 B2
(45) Date of Patent: Mar. 20, 2007

(54) HANDHELD ELECTRONICS DEVICES WITH MULTIPLE USER SENSORY TRANSDUCERS AND METHODS

(75) Inventor: Ian Lewis, Grayslake, IL (US)

(73) Assignee: Motorola, Inc., Schaumburg, IL (US)

( * ) Notice: Subject to any disclaimer, the term of this patent is extended or adjusted under 35 U.S.C. 154(b) by 265 days.

(21) Appl. No.: 10/458,688

(22) Filed: Jun. 10, 2003

(65) Prior Publication Data

US 2004/0252857 A1    Dec. 16, 2004

(51) Int. Cl.
*H04R 25/00* (2006.01)

(52) U.S. Cl. .................. 381/182; 381/388; 381/355

(58) Field of Classification Search ........ 381/303–306, 381/311, 162, 182, 388, 396; 455/569.1, 455/575.1
See application file for complete search history.

(56) References Cited

U.S. PATENT DOCUMENTS

| | | | |
|---|---|---|---|
| 4,249,417 A | | 2/1981 | Feldstein et al. |
| 4,392,095 A | * | 7/1983 | Ruxton et al. ............ 318/254 |
| 4,566,327 A | | 1/1986 | Rider |
| 5,528,697 A | | 6/1996 | Saito |
| 5,627,902 A | * | 5/1997 | Ziarati ...................... 381/385 |
| 6,094,564 A | * | 7/2000 | Tomiya et al. ............. 455/73 |
| 6,259,935 B1 | * | 7/2001 | Saiki et al. ............... 455/567 |
| 6,590,994 B2 | * | 7/2003 | Tanase et al. ............. 381/431 |
| 6,725,109 B2 | * | 4/2004 | Hile et al. ................. 700/94 |
| 6,744,904 B2 | * | 6/2004 | Kobayashi et al. ........ 381/396 |
| 6,819,939 B2 | * | 11/2004 | Masamura ............... 455/550.1 |
| 2001/0023197 A1 | | 9/2001 | Shibata |
| 2002/0177471 A1 | * | 11/2002 | Kaaresoja et al. ......... 455/567 |
| 2004/0057578 A1 | * | 3/2004 | Brewer .................... 379/433.1 |

FOREIGN PATENT DOCUMENTS

EP   1 187 510 A2   3/2002

OTHER PUBLICATIONS

Philips Components Philips Sound Solutions LOB Telecom, "1st Specification for 4×5×12 mm Virbator with contact surface", 5 pages.

* cited by examiner

*Primary Examiner*—Suhan Ni
(74) *Attorney, Agent, or Firm*—Ronald K. Bowler, II

(57) ABSTRACT

An electronics device (100), for example, a cellular telephone, includes a plurality of discrete transducers, one of which is a dynamic loudspeaker device (162) and the other being a linear vibrating device (164). In another embodiment, two or more linear vibrators within device housing are driven with signals having different frequency and/or time variant characteristics to provide different sensory effects for the user.

22 Claims, 4 Drawing Sheets

HANDHELD ELECTRONICS DEVICES WITH MULTIPLE USER SENSORY TRANSDUCERS AND METHODS

FIELD OF THE DISCLOSURE

The present disclosure relates generally to electronics devices having transducers, and more particularly to electronics devices having multiple transducers capable of providing user perceptible sensations, for example, mobile wireless communications handsets having audio loudspeakers and tactile indicators, and methods therefor.

BACKGROUND

It is known generally to provide vibration alert sensations in cellular telephones by rotating an eccentrically mounted mass. These rotary devices however have slow response and attack times, which substantially limits their range of applicability. Rotary vibration devices are used primarily for alerting users to incoming calls or messages, an application for which expedient response times are not required.

U.S. Pat. No. 5,528,697 entitled "Integrated Vibrating And Sound Producing Device" discloses an integral device capable of producing both audible buzzer sounds and/or low frequency vibrations for use in radio-activated paging devices and in signal receivers for hearing-impaired individuals.

Integrated multi-function transducers inevitably compromise performance of both vibration and audio functions. Dynamic loudspeakers, for example, are preferably mounted in cavities having a closed-end portion and an open-end to promote optimal sound propagation. Mounting integrated devices in cavities, however, tends to compromise the vibrator performance.

Existing integrated multi-function transducers suitable for use in cellular telephone applications also have large dimensions, since minimal transducer thickness and minimal diameter are required to provide user perceptible vibration signal amplitudes and sound pressures. In at least some applications, particularly in increasingly smaller cellular handsets favored recently by consumers, large integrated transducer packages pose substantial integration and assembly issues. Additionally, potential radio frequency interference between integrated transducers and radio antennas limits where integrated transducers may be mounted in handset housings.

The various aspects, features and advantages of the present inventions will become more fully apparent to those having ordinary skill in the arts upon careful consideration of the following Detailed Description of the Invention with the accompanying drawings described below.

DETAILED DESCRIPTION

Figure 1:
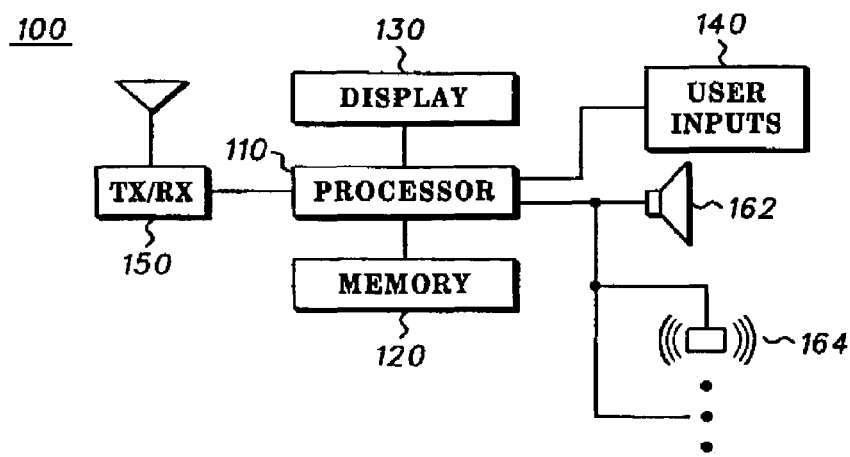
FIG. 1 is an exemplary electronics device.

FIG. 1 illustrates an exemplary handheld electronics device 100, for example, a cellular telephone, or a personal digital assistance, or a digital organizer, or a laptop computer, or a handheld information device, or some other device. The exemplary electronics device 100 comprises generally a processor 110 coupled to memory 120, for example, ROM, RAM, EPROM, etc. The exemplary device also includes a display 130, though other device embodiments may not include a display.

In FIG. 1, the device also includes user inputs 140, for example, a keypad, and possibly pointers or other input devices. Some embodiments of the device 100 include a radio transmitter or a receiver or a transceiver 150. Devices with a transmitter, recording capability, etc., may also include a microphone input. The exemplary electronics device 100 also includes outputs 160, for example, an audio output device 162, a tactile sensation generating output device 164, both of which are discussed more fully below, among other output devices, for example, audio and data signal output jacks, which are known but not illustrated.

In one embodiment, the device includes first and second discrete transducers. The transducers may be of the same general type or different types. The first and second transducers generally have corresponding frequency characteristics, which may be similar or different. In some embodiments, the frequency characteristics of the first and second transducers is the same, for example, in applications where stereo sound is provided with two or more similar speakers or by other multi-phonic sound generating devices spaced apart on the housing. Other devices have two or more similar transducers with the same frequency response characteristics. In some applications, for example, different resonance or vibration modes may be established with similar transducers oriented differently in the housing of the electronics device. More generally, the frequency response of the first and second discrete transducers is different. In one embodiment, for example, one transducer is an audio transducer and the other one is a tactile transducer. These and other aspects of the disclosure are discussed more fully below.

In one embodiment, one or more of the transducers is a linear vibrating device. Generally, linear vibrating devices have dynamic outputs that are essentially proportional to input current, thus making these devices suitable for providing tactile sensations or alerts in cellular handsets, pagers and in other electronics devices. Linear vibrating devices also have relatively fast response times compared with other vibrating devices, for example, rotating vibrators. The relatively quick response times of linear vibrating devices enables their use in a wide range of applications, for example, for providing tactile feedback in response to keystroke inputs, and in other applications where substantial delay is intolerable.

Linear vibrating devices are also generally capable of operating in different transient modes than traditional rotating vibration devices. When stimulated, rotating vibration devices undergo transient phase passing through several resonant frequencies of the housing. Similar resonance effects are produced when rotating vibration devices are de-stimulated. In contrast, linear vibrating devices may be stimulated at a single frequency with varying amplitudes or with complex signals varying with time and/or frequency. Linear vibrating devices thus allow more information to be conveyed to the user by choosing different stimulus.

Figure 2:
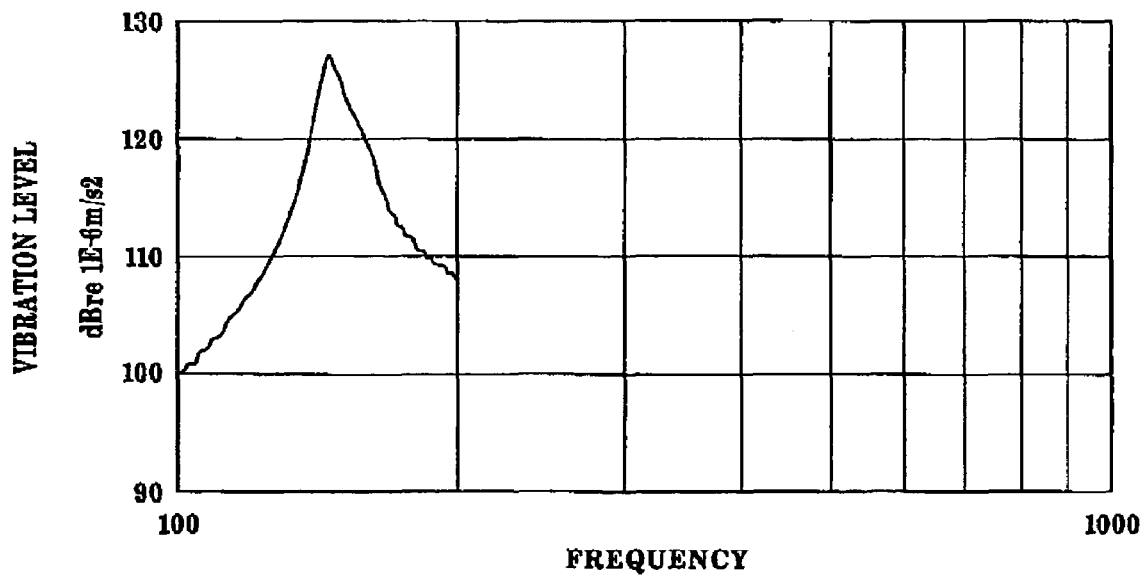
FIG. 2 is an exemplary response characteristic for a linear vibrating device.
Figure 3:
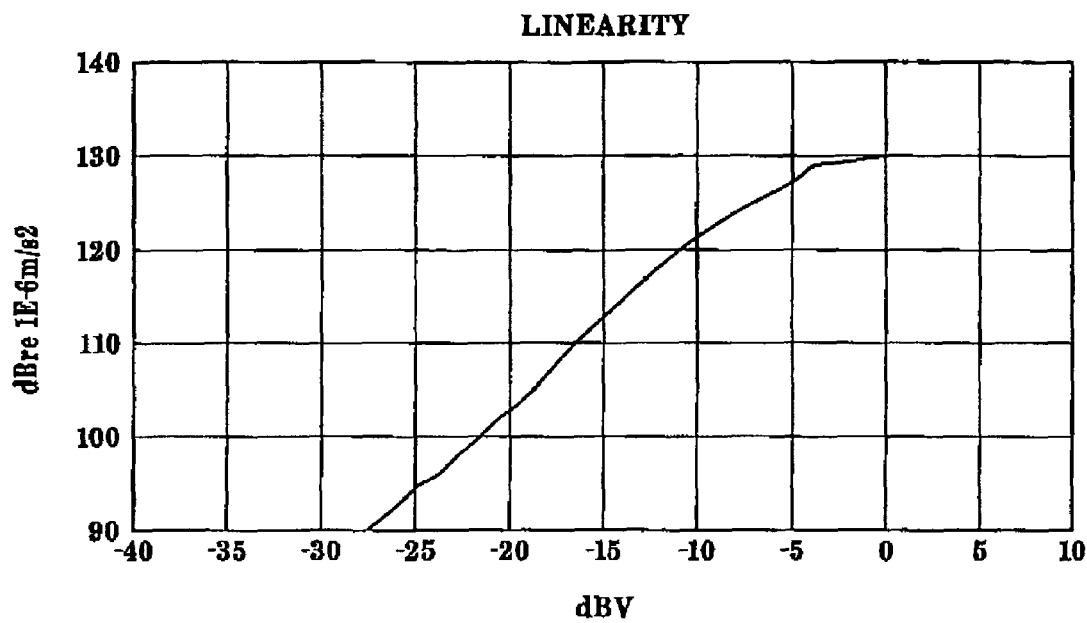
FIG. 3 illustrates the linearity of the vibration level of a linear device over its operating range.

FIG. 2 is an exemplary frequency response curve for a linear vibrating device. The curve plotted in FIG. 2 is a measure of vibration level versus frequency. The curve plotted in FIG. 3 illustrates the linearity of an exemplary linear vibrating device response over a substantial portion of its operating range. Linear electromechanical vibrating devices suitable for the exemplary applications disclosed herein and other applications are available from Philips Electronics Sound Solutions and from Matsushita Electric Industrial Co., Ltd.

Figure 4:
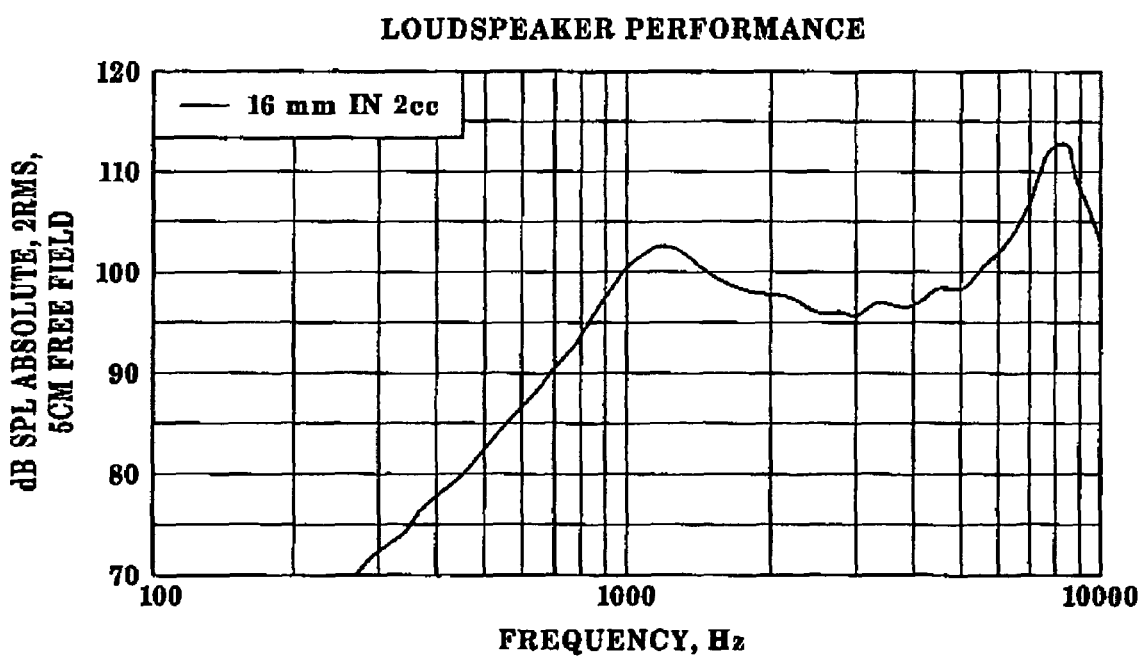
FIG. 4 is an exemplary response characteristic for a dynamic loudspeaker.

In another embodiment, one or more of the discrete transducers in the exemplary electronics device is a dynamic loudspeaker. FIG. 4 is an exemplary dynamic loudspeaker frequency response curve, which is a measure of sound pressure level versus frequency.

Figure 5:
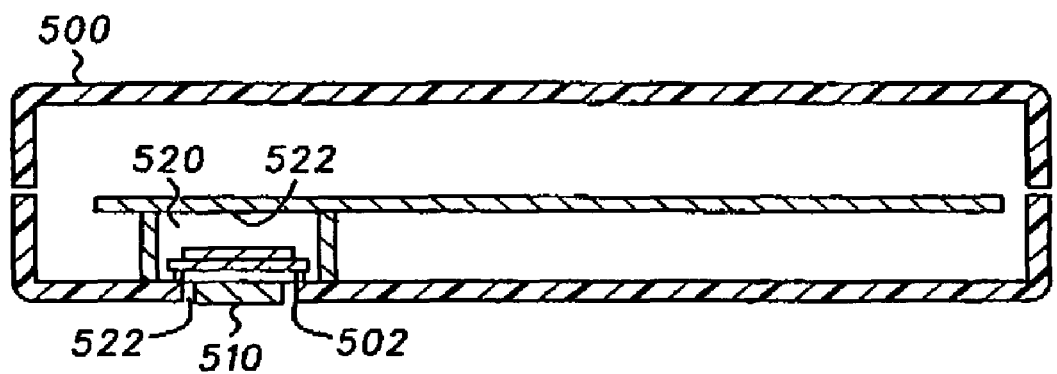
FIG. 5 is an exemplary electronics device housing having a dynamic loudspeaker.

In one exemplary embodiment, the electronics device, for example a cellular telephone, includes one or more linear transducers for tactile sensation and one or more dynamic loudspeakers for sound production. FIG. 5 illustrates an electronics device handset housing 500 having a dynamic loudspeaker 510 rigidly mounted in a chamber or cavity 520 in the housing. In some embodiments, the cavity 520 is only partially sealed, for example, in or along the rear portion 522 thereof to facilitate propagation of sound through a cavity opening 522 in a portion 502 of the housing. The opening may be on a back or rear-side of the housing or at some other location. In other embodiments, the cavity may also include other structure, for example, vents, delay, compliant or inertial structures, for optimizing the audio performance of the loudspeaker.

Figure 6:
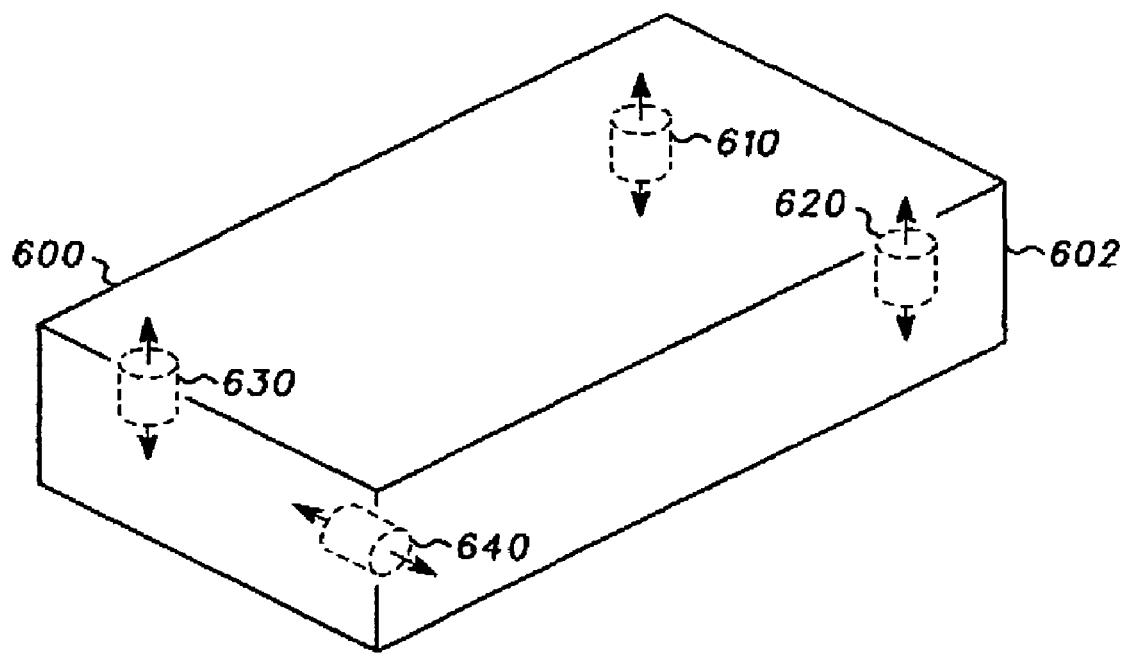
FIG. 6 illustrates exemplary linear vibrating device mounting configurations in an electronics device housing.

FIG. 6 illustrates a housing portion 600 having one or more linear transducers mounted thereon. In one configuration, one or more transducers are mounted at corresponding locations in the housing, for example, on a printed circuit board or on some other rigid structure of the device. In some cellular handset applications, for example, the transducers are separately mounted on or near a portion of the housing that optimizes the transmission of vibration energy to the user. In FIG. 6, first and second linear vibrating transducers 610 and 620 are disposed toward one end 602 of the housing, for example, a portion of the housing that clips or otherwise fastens on or near the user's body.

In applications where tactile sensation is desired, several relatively small-sized linear vibrating transducers may be used to make use of whatever space is available in the housing without the need for a single, relatively large space for accommodating an integrated transducer. Separation of the transducers, for example, a dynamic loudspeaker and a linear vibrating device or multiple linear vibrators, also increases the likelihood that the discrete transducers may be positioned away from components susceptible to interference, for example, radio frequency transceiver antennas. The separation of dynamic loudspeakers from tactile transducers, for example, linear vibrators or other vibrating devices, permits optimizing the performance of each transducer without compromising one or the other.

In some embodiments, one or more linear vibrating transducers are mounted within the housing in orientations that optimize the transfer of vibration energy from the one or more transducers to the user. Multiple transducers may also be located and oriented to provide different tactile sensations. In FIG. 6, for example, it may be desirable in some applications to orient one transducer 630 so that it vibrates predominately transversely to a second transducer 640, and more generally so that the predominant vibration axes of transducers are anti-parallel. In other embodiments however, it may be desirable to align the vibrations axes of the multiple transducers, for example, to provide a pronounced effect.

Figure 7:
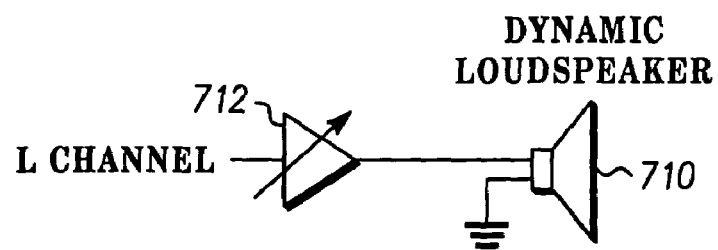
FIG. 7 is an exemplary schematic circuit diagram.
Figure 7:
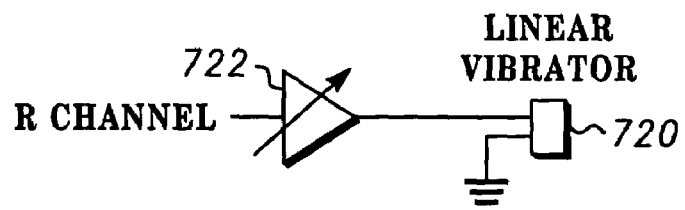

The one or more transducers are generally coupled to a driver circuit. In the exemplary embodiment of FIG. 7, a dynamic loud speaker 710 is coupled to a corresponding driver circuit 712, which is an audio frequency band amplifier. A linear vibrating device 720 is coupled to a corresponding driver circuit 722, which amplifies in a corresponding frequency band. The exemplary driver circuits 712 and 722 are discrete, although in other embodiments they may be integrated in a baseband processor or with the corresponding transducers.

In one embodiment, a loudspeaker is driven from one channel of a stereo output signal and a linear vibrator is driven from the other channel of the stereo output signal, wherein the signal strength and frequency range for each channel is selected appropriately for each transducer at a stereo system signal processor from which the stereo output signal is produced. Thus in FIG. 7, the drivers 712 and 722 each receive corresponding signals from a processor, for example, processor 110 in FIG. 1. In one exemplary embodiment, first and second signals are input to the driver 712 and 722 from right and left channel signal outputs of a common stereo signal source, although in other embodiments the signal may have other sources.

Figure 8:
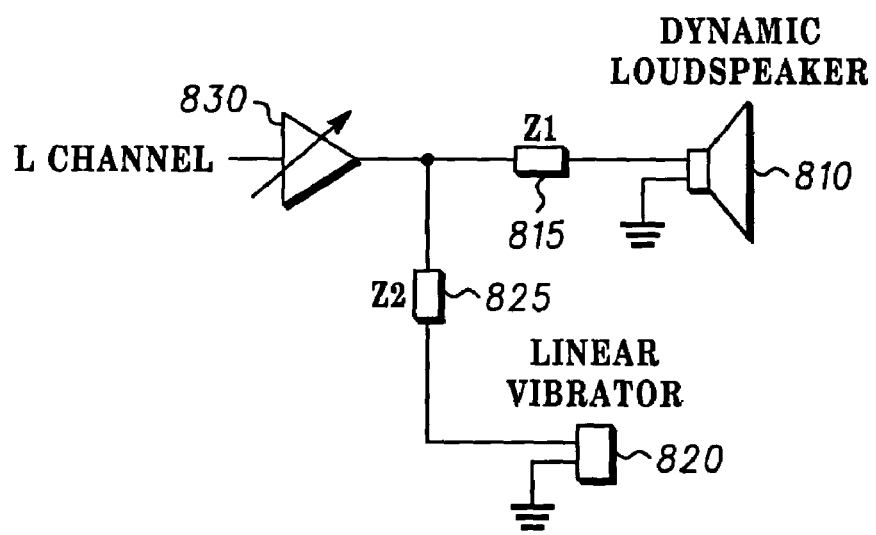
FIG. 8 is another exemplary schematic circuit diagram.

In some embodiments, multiple transducers are driven by the same source. In the exemplary circuit of FIG. 8, a common signal is applied to first and second transducers 820 and 830 by a common driver circuit 830, which must provide signal amplification for frequencies common to both of the transducers 820 and 830. In FIG. 8, circuits 815 and 825 condition the signal output from the common driver 830 before application of the signal to the corresponding transducers. The circuits 815 and 825 are, for example, passive crossover networks that appropriately filter the signals applied to the corresponding transducers 810 and 820, respectively. In one embodiment, the common signal is on one of the right or left channels of a stereo output signal.

In one embodiment, the electronics device includes first and second linear vibrators mounted separately within the housing, for example, at different locations therein and/or with their primary vibration axes oriented differently.

The first and second linear vibrators may be driven to provide a variety of vibration sensations or effects perceived by the user. In some applications, for example, first and second linear vibrators are driven with input signals having different time variant characteristics. In other applications, the vibrators are driven with input signals having different frequency characteristics.

In one embodiment, for example, at least two linear vibrators are driven with input signals to provide different beats in the electronics handset. In another embodiment, at least two linear vibrators are driven with input signals to pan a vibrating sensation across portions of the electronics handset. In yet another embodiment, the electronics handset housing is caused to rock by driving multiple linear vibrators with corresponding input signals that provide rocking motion.

While the present disclosure and what is considered presently to be the best modes thereof have been described sufficiently to establish possession by the inventors and to enable those of ordinary skill to make and use the inventions, it will be understood and appreciated that there are equivalents to the exemplary embodiments disclosed herein and that many modifications and variations may be made thereto without departing from the scope and spirit of the inventions, which are to be limited not by the exemplary embodiments but by the claims appended hereto.

What is claimed is:

1. A handheld electronics device, comprising:
a handheld housing;
a transducer driver circuit having a signal output, the transducer driver circuit having an amplifier with an output corresponding to the signal output;
a first discrete transducer disposed in the handheld housing, the first transducer having a first transducer input coupled to the signal output of the transducer driver circuit;
a second discrete transducer disposed in the handheld housing, the second transducer having a second transducer input coupled to the signal output of the transducer driver circuit,
the first transducer having a first frequency characteristic, the second transducer having a second frequency characteristic, the first and second transducers coupled to the same output of the amplifier.

2. The handheld electronics device of claim 1, the first transducer is a linear vibrating device, the second transducer is a dynamic loudspeaker.

3. The handheld electronics device of claim 1, the first transducer coupled to the output of the amplifier by a first passive signal conditioning circuit, the second transducer coupled to the output of the amplifier by a second passive signal conditioning circuit.

4. The handheld electronics device of claim 1 further comprising a stereo signal source having right and left channel signal outputs, the amplifier has an input coupled to one of the right or left stereo channel signal outputs of the stereo signal source.

5. The handheld electronics device of claim 1, the first frequency characteristic of the first transducer is different than the second frequency characteristic of the second transducer.

6. The handheld electronics device of claim 1 is a communications handset including a processor and a radio transceiver coupled to the processor, an audio receiver coupled to the processor.

7. A method in an electronics handset, the method comprising:
providing a vibrating sensation with a first linear vibrator of the electronics handset in response to a first input signal applied to the first linear vibrator;
providing the vibrating sensation with a second linear vibrator of the electronics handset in response to a second input signal applied to the second linear vibrator,
the first and second linear vibrators are discrete devices disposed within a housing of the electronics handset.

8. The method of claim 7, providing the vibrating sensation with the first and second linear vibrators of the electronics handset in response to first and second input signals having different time variant characteristics.

9. The method of claim 7, driving the first and second linear vibrators of the electronics handset with the first and second input signals to provide different effects perceived by the user.

10. The method of claim 7, driving the first and second linear vibrators of the electronics handset with the first and second input signals to provide different beats.

11. The method of claim 7, driving the first and second linear vibrators of the electronics handset with the first and second input signals to provide a rocking motion of the electronics handset.

12. The method of claim 7, driving the first and second linear vibrators of the electronics handset with the first and second input signals to pan the vibrating sensation across the electronics handset.

13. The method of claim 7, providing the first signal and the second signal to the first and second linear vibrators as a composite signal.

14. The method of claim 13, conditioning the composite signal provided to the first and second linear vibrators with corresponding passive circuits.

15. The method of claim 7, providing the first and second signals to the first and second linear vibrators as discrete, non-composite signals.

16. A handheld electronics device, comprising:
a handheld housing;
a transducer driver circuit having a signal output;
a first linear vibrator disposed in the handheld housing, the first linear vibrator having a first input coupled to the signal output of the transducer driver circuit;
a second linear vibrator disposed in the handheld housing, the second linear vibrator having a second input coupled to the signal output of the transducer driver circuit,
the first linear vibrator having a first frequency characteristic, the second linear vibrator having a second frequency characteristic.

17. The handheld electronics device of claim 16, the first frequency characteristic of the first linear vibrator is substantially the same as the second frequency characteristic of the second linear vibrator.

18. The handheld electronics device of claim 16, vibration axes of the first and second linear vibrators have different orientations within the housing.

19. The handheld electronics device of claim 18, the transducer driver circuit for generating first and second drive signals having different time variant characteristics and for providing the first and second drive signals to the first and second linear vibrators.

20. The handheld electronics device of claim 18, the transducer driver circuit for driving the first and second linear vibrators with input signals that provide different beats.

21. The handheld electronics device of claim 18, the transducer driver circuit for driving the first and second linear vibrators of the electronics device with input signals that provide a rocking motion of the electronics device.

22. The handheld electronics device of claim 18, the transducer driver circuit for driving the first and second linear vibrators of the electronics device with input signals that pan a vibrating sensation across the electronics device.

* * * * *